United States Patent [19]
Clauss, Jr. et al.

[11] Patent Number: 5,929,350
[45] Date of Patent: Jul. 27, 1999

[54] APPARATUS FOR IDENTIFYING TYPE OF MOLTEN METAL PROBE

[75] Inventors: Harry G. Clauss, Jr., Delanco, N.J.; Jeffrey W. Corey, Bethlehem, Pa.

[73] Assignee: Heraeus Electro-Nite International, Antwerp, Belgium

[21] Appl. No.: 09/083,592

[22] Filed: May 22, 1998

Related U.S. Application Data

[60] Provisional application No. 60/047,478, May 23, 1997.

[51] Int. Cl.$^6$ ........................................ G01N 1/00
[52] U.S. Cl. ............................................. 73/866.5
[58] Field of Search ................. 73/864.53–864.59, 73/866.5, 866.8, DIG. 9; 374/139, 140; 266/99

[56] References Cited

U.S. PATENT DOCUMENTS

| | | | |
|---|---|---|---|
| 5,168,764 | 12/1992 | Falk | 73/866.5 |
| 5,610,346 | 3/1997 | Stelts | 73/866.5 |

*Primary Examiner*—Robert Raevis
*Attorney, Agent, or Firm*—Panitch, Schwarze, Jacobs & Nadel, P.C.

[57] ABSTRACT

A universal connector apparatus for probes used for measuring one or more parameters of molten material which identifies a probe type is provided. The probes each include a probe connector having a plurality of contacts arranged in a contact configuration. The universal connector is adapted to be connected to a drop mechanism, and includes a receptacle which is complementary to and adapted to receive a probe connector. A plurality of contacts are located in the receptacle and are positioned to provide electrical connections with the probe connector contacts. An identifying device is electrically connected to the contacts in the receptacle to detect short circuits between the contacts.

4 Claims, 3 Drawing Sheets

APPARATUS FOR IDENTIFYING TYPE OF MOLTEN METAL PROBE

CROSS-REFERENCE TO RELATED APPLICATIONS

This application claims the benefit of U.S provisional application Ser. No. 60/047,478, filed May 23, 1997.

BACKGROUND OF THE INVENTION

The present invention relates generally to molten metal probes with sensor devices and, more particularly, to a connector apparatus which is adapted to being connected to various types of molten metal probes for facilitating identification of which type of probe or sensor device is connected thereto.

Sensors or probes containing sensor devices employed for the measurement of certain characteristics of molten metal are generally well known in the art as exemplified, for example, by U.S. Pat. No. 5,584,578, the disclosure of which is hereby incorporated herein by reference. Probes of the type described in the identified patent are particularly classified as being of the "drop-in" type because such probes are specifically adapted to be dropped into molten metal for performing a desired measurement at a predetermined depth in the molten metal. Some such probes are employed for measuring metal temperature, other probes are employed for measuring temperature and oxygen content of the molten metal, other probes are employed for measuring carbon content and temperature and yet, other probes are employed for measuring other metal parameters. A single operator controlled drop mechanism having multiple drop-in probes of various different types, each attached to a separate connector of the drop mechanism, is typically employed for receiving the various probes, positioning the probes above a molten metal bath and, thereafter, selectively or sequentially releasing the probes, one at a time, to fall into the molten metal bath to perform the desired measurement(s). A measurement instrument associated with the drop mechanism is used for receiving electrical signals from the probes which relate to the appropriate measurement(s).

It is desirable to take different measurements from a single molten metal bath at different times using different sensors in a generally random manner, while still utilizing the same drop mechanism and measurement instrument for each of the different drop-in probes. It is necessary for an operator to select in advance which type of sensor or probe is being dropped into the molten metal to know which molten metal parameter(s) is being measured. With the prior art, an operator or other person had to physically position each of the different types of probes in specific locations on the drop mechanism prior to the probes being dropped and the measurement taken. For example, when a twelve probe drop mechanism is employed, locations 1–6 may be loaded with temperature probes and positions 7–12 may be loaded with temperature/oxygen probes. Alternatively, special instrumentation measuring circuits must be employed to monitor the output signals of each sensor or probe and, based upon the output signals, to determine the type of probe providing the output signals and, thus, the parameter(s) being measured. This process is highly inefficient. Thus, there is a need for a way to determine the type and location of the various different probes on a multiple probe drop mechanism to permit different types of measurement probes to be quickly and conveniently dropped into a molten metal bath without the need to spend additional time individually visually or otherwise verifying the type of probe which has been attached to the various locations of the drop mechanism. The present invention comprises a universal connector apparatus, a number of which are used in conjunction with a multiple probe drop mechanism and measurement instrument (one for each position) which is adapted for receiving at any given time any random combination of different probes, and permitting an operator to identify the specific type of probe which has been inserted into each connector on the mechanism prior to the probe being dropped into the molten metal and without the need for a visual or other inspection.

SUMMARY OF THE INVENTION

Briefly stated, the present invention provides a universal connector apparatus for probes used for measuring one or more parameters of molten material which identifies a probe type. Each probe is provided with a probe connector having a plurality of contacts arranged in a contact configuration. The universal connector is adapted to be connected to a drop mechanism. The universal connector includes a receptacle which is complementary to and adapted to receive a probe connector. A plurality of contacts are located in the receptacle which are positioned to provide electrical connections with the probe connector contacts. An identifying device is connected to the contacts in the receptacle to detect short circuits between the contacts.

In another aspect, the present invention provides a method of identifying a probe type in a drop mechanism for probes of the type used for measuring one or more parameters of molten material after the probe is connected to the drop mechanism, the drop mechanism including a plurality of universal connectors. The method includes the steps of:

placing at least one probe in the drop mechanism and inserting a probe connector from the at least one probe into a receptacle of one of the plurality of universal connectors located on the probe drop mechanism such that contacts on the probe connector are electrically connected to contacts in the universal connector;

detecting short circuits between the contacts located in the plurality of universal connectors; and identifying the probe type of the probe in the one of the universal connectors based on the short circuits detected.

BRIEF DESCRIPTION OF THE SEVERAL VIEWS OF THE DRAWINGS

The following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
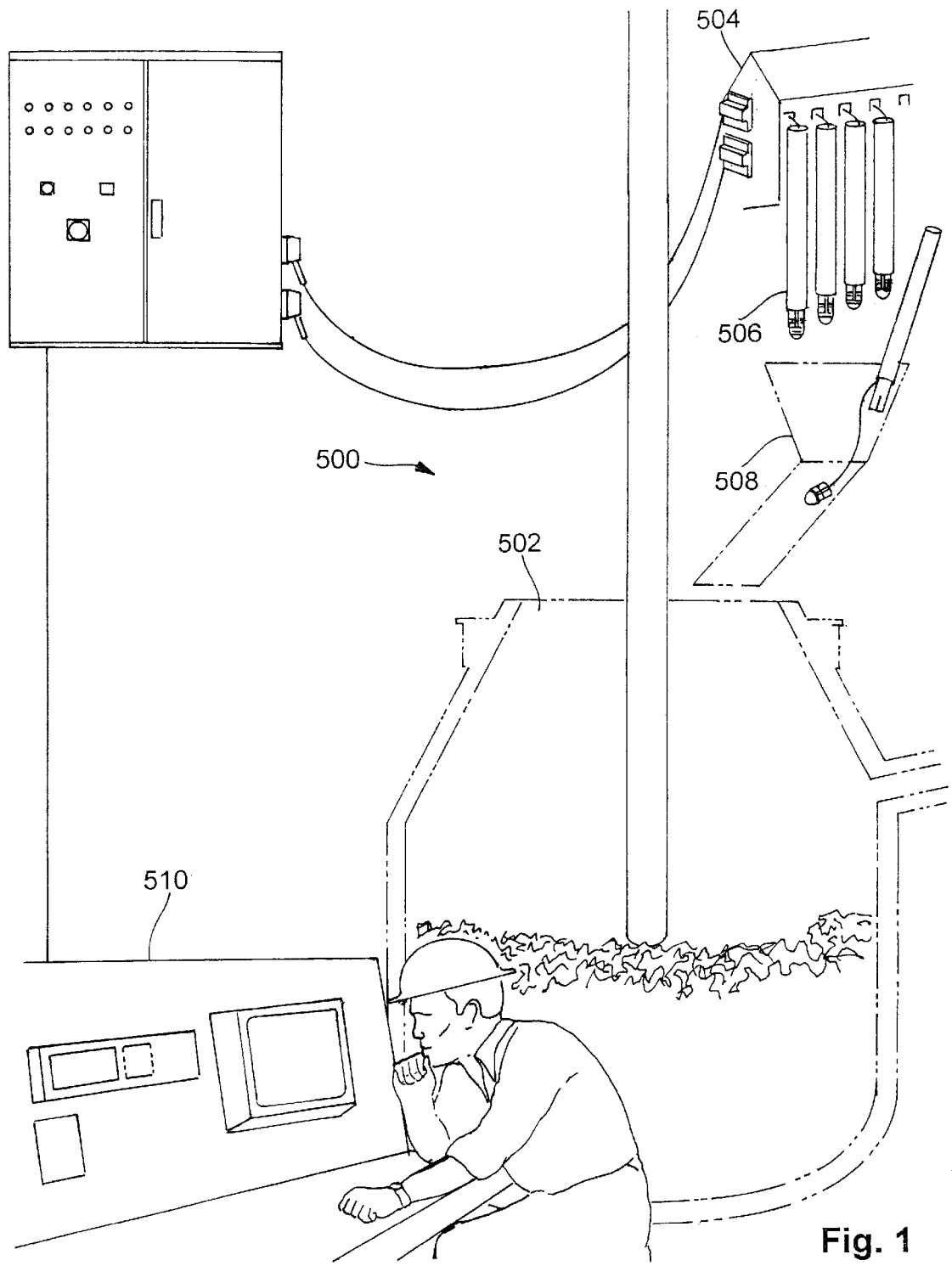
FIG. 1 is a diagrammatic illustration of a typical steelmaking facility employing a connector in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the apparatus for identifying the type of molten metal probe, and designated parts thereof. The terminology includes the words above specifically mentioned, derivatives thereof and words of similar import.

FIG. 1 diagrammatically illustrates the typical operation of a steel-making facility 500 which includes a steel-making furnace 502 containing molten metal (not shown). Positioned above the steel-making furnace 502 is an automated drop mechanism 504 of a type generally well known to those of ordinary skill in the art. The drop mechanism 504 is employed for dropping, preferably one at a time, a series of probes 506 which are adapted to fall downwardly through a chute 508 and into the molten metal for measuring certain parameters of the molten metal. Operation of the drop mechanism 504 is remotely controlled by an operator located at an operator control panel 510. Preferably, the drop mechanism 504 includes a plurality of probes 506, typically twelve such probes. The probes 506 which are initially supported by the drop mechanism 504, may include various types of sensors or sensor portions which will hereinafter be described in greater detail.

Figure 2:
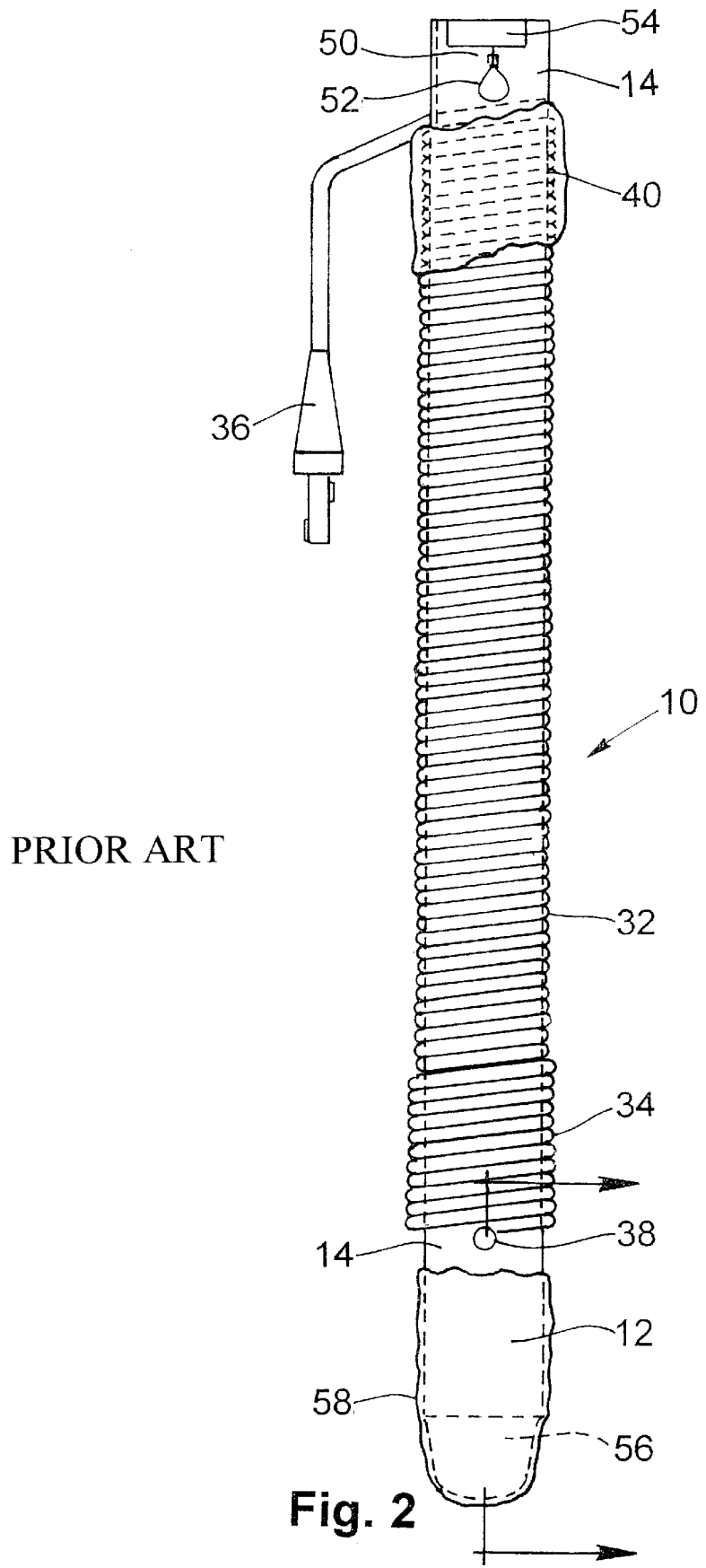
FIG. 2 is an elevational view of a drop-in immersion probe in accordance with U.S. Pat. No. 5,584,578.

Referring now to FIG. 2, there is shown in substantial detail a drop-in immersion probe 10 of the type described in U.S. Pat. No. 5,584,578. The probe 10 includes a measurement head or sensor head 12 within which is located the components necessary for measuring one or more molten metal parameters. The sensor head 12 includes a plurality of contacts (not shown in FIG. 2) to which are electrically connected a lead wire typically containing two or more conductors which together are rubber insulated and are formed into a jacketed cable 32 which extends out of the sensor head 12. The cable 32 is wound about (or within) a support tube 14 typically made of cardboard. The distal end of the cable 32 includes a male connector 36 of a type well known to those of ordinary skill in the art. The connector 36 includes a plurality of individual electrical contacts, the number and position of which are determined by the number of conductors and the number of contacts necessary for proper functioning of the sensor portion of the probe 10.

Figure 3:
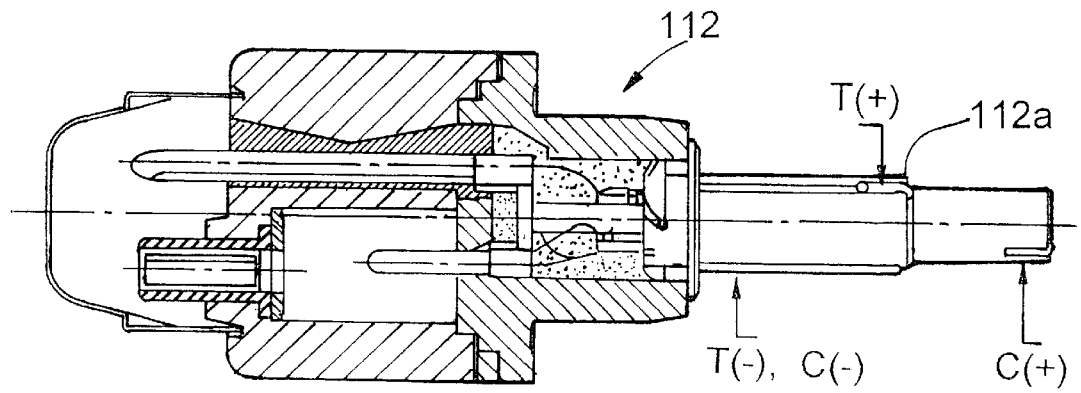
FIG. 3 is a partial sectional elevational view of the sensor component of a first probe employed for measuring one or more characteristics of a molten metal.
Figure 4:
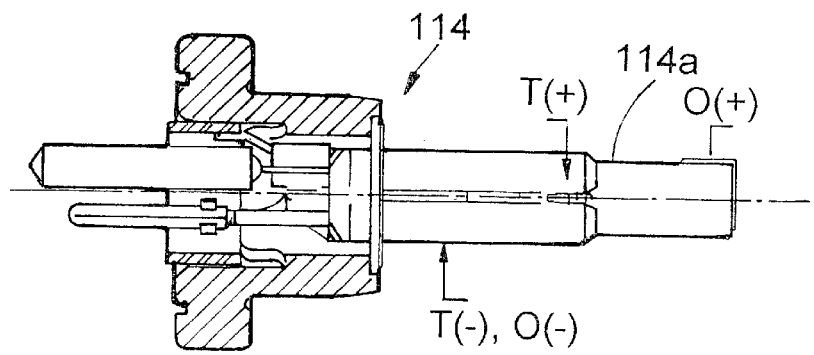
FIG. 4 is a partial sectional elevational view of the sensor portion of a second probe employed for measuring one or more characteristics of a molten metal.
Figure 5:
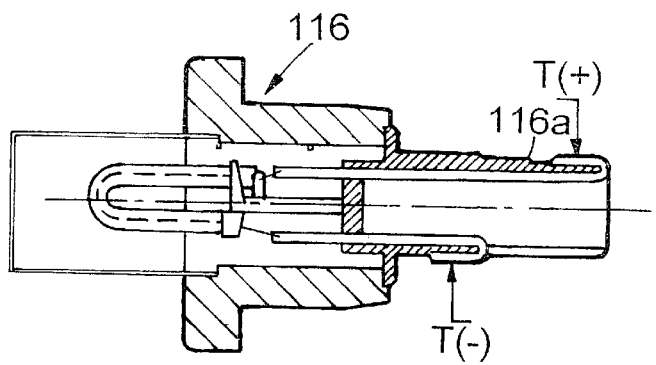
FIG. 5 is a partial elevational view of the sensor portion of a third probe employed for measuring one or more characteristics of a molten metal.
Figure 6:
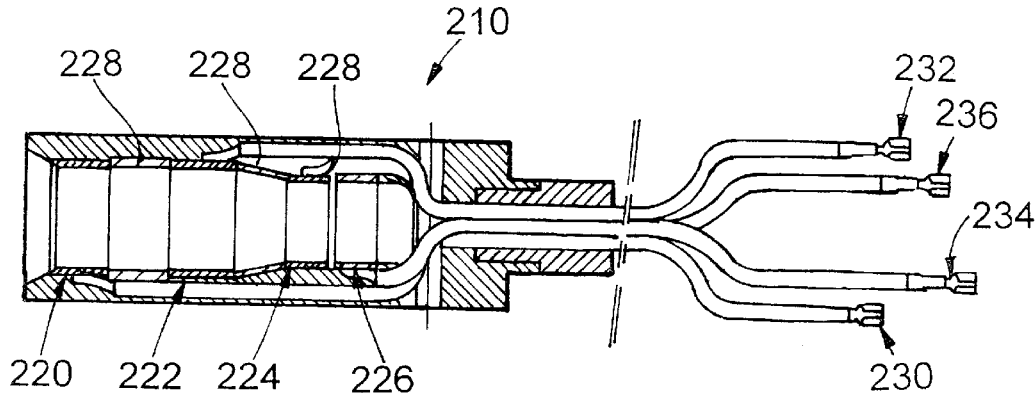
FIG. 6 is a sectional elevational view of a probe receiving connector adapted to be employed in connection with a drop mechanism for receiving and retaining therein any of the probes of FIGS. 1–3.

FIG. 6 illustrates a universal female connector 210 in accordance with the present invention. The connector 210 is adapted for use in connection with measurement instrumentation (not shown) associated with a drop mechanism such as a twelve position drop mechanism 504 as shown in FIG. 1. It will be appreciated by those of ordinary skill in the art that if the drop mechanism 504 has twelve positions, twelve such connectors 210 will be employed. The connector 210 is adapted to receive and retain therein any one of a series of connectors 36 associated with any one of a series of probes 506 having different molten metal sensor devices, three of which 112, 114, 116 are illustrated in FIGS. 3–5. Each of the sensors 112, 114, 116 shown in FIGS. 3–5 includes external electrical connections located on the exterior surface of the tail end 112a, 114a, 116a, respectively, which in turn, are electrically connected (not shown) through a suitable lead wire cable 32 to a corresponding connector 36 in the manner of the probe 10 of FIG. 2. For example, the two thermocouple sensor 112 shown in FIG. 3 includes three such electrical connections, a C(+) connection, a T(+) connection, and a common T(-)/C(-) connection which are spaced apart as shown on FIG. 3. Similarly, sensor 114 shown in FIG. 2 includes one thermocouple and one galvanic cell circuit and has three such connections located on the outer surface of the tail end portion 114a including an O(+) connection, a T(+) connection, and a common T(-)/O(-) connection. Finally, the single thermocouple sensor 116 of FIG. 5 includes two connections on the outer surface of the tail portion 116a thereof, namely, a T(+) connection and a T(-) connection. As best shown in FIG. 2, the connector 36 associated with each of the sensors 112, 114, 116 has a contact configuration which is substantially the same as the contact configuration shown on the respective tail ends 112a, 114a, 116a of the sensors.

The connector 210 shown in FIG. 6 is adapted to receive at any given time the connector 36 of a probe including any one of the sensors 112, 114, 116 shown in FIGS. 3–5. The connector 210 is secured to a drop mechanism 504 which is adapted to thereafter drop the associated probe and, specifically, the sensor 112, 114, 116 into the molten metal bath so that the sensor 112, 114, 116 sinks into the molten metal and measures the desired parameter(s). Electrical output signals from the sensor 112, 114, 116 flow through the lead wire cable 32, connector 36, connector 210, and are sent to the measurement instrumentation (not shown). Typically, the various probes 506 are removably secured to the drop mechanism 504 and the various connectors 36 are inserted within corresponding connectors 210 associated with the drop mechanism 504 at a location which is remote from the operator control panel 510. Thus, the operator of the drop mechanism 504 may not know, at any given time, which of the locations on the drop mechanism 504 supports a probe having a different type of sensor 112, 114, 116 unless the operator is specifically told at the time the corresponding probe 506 is secured to the drop mechanism 504. The present invention overcomes the problems associated with the prior art by providing within each connector 210 a series of four generally annular conductive rings 220, 222, 224, 226. Each of the conductive rings 220, 222, 224, 226 is electrically insulated from each other utilizing a suitable insulating material 228. Each of the conductive rings 220, 222, 224, 226 is electrically connected to a corresponding electrical wire 230, 232, 234, 236 which extends out of the connector 210 and, through the drop mechanism 504, to the control panel 510 of the drop mechanism. By identifying which ones of the conductive rings 220, 222, 224, 226 are short circuited together when the connector 36 of a probe is installed within a connector 210, the operator of the drop mechanism 504 can quickly and conveniently identify which of the sensors 112, 114, 116 is attached to each drop mechanism position in a manner which will hereinafter be described.

When each of the probe connectors 36 is inserted into a corresponding connector 210 of the drop mechanism 504, a short circuit is created between rings 220 and 222. If the sensor of the particular probe is a single thermocouple sensor of the type shown in FIG. 5, neither of the other conductive rings 224, 226 is short circuited. Alternatively, if the probe includes a sensor 114 of the type shown in FIG. 4, in addition to creating a short circuit between rings 220 and 222, a short circuit is created between rings 224 and 226. Finally, if the sensor is of the type shown in FIG. 3, short circuits are created between rings 220 and 222, between rings 220 and 224, and between rings 224 and 226. By remotely identifying which of the wires 230, 232, 234, 236 extending from the annular rings 220, 222, 224, 226 are short circuited together, the operator of the drop mechanism 504 can quickly and conveniently identify with specificity, from the control panel 510, exactly which type of probe having which type of sensor 112, 114 or 116 has been installed into the corresponding connector 210 at each location on the drop mechanism 504 before the measuring process begins so that the operator can select and then drop a particular probe type and can take the proper steps for obtaining the corresponding appropriate measurement(s) immediately when the probe 506 is dropped into the molten metal.

From the foregoing description, it can be seen that the present invention comprises an apparatus for remotely identifying the type of sensor associated with a probe which is being employed in connection with a drop mechanism for measuring one or more parameters of molten metal. It will be appreciated by those of ordinary skill in the art that changes may be made in the embodiment described above without departing from the broad inventive concept thereof. It is understood, therefore, that this invention is not limited to the particular embodiment disclosed but is intended to cover all modifications within the scope and spirit of the invention.

What is claimed is:

1. A universal connector apparatus for probes used for measuring one or more parameters of molten material which identifies a probe type, each probe including a probe connector having a plurality of contacts arranged in a contact configuration, the universal connector being adapted to be connected to a drop mechanism, the universal connector apparatus comprising:

a receptacle which is complementary to and adapted to receive a probe connector;

a plurality of contacts located in the receptacle which are positioned to provide electrical connections with the probe connector contacts; and an identifying device electrically connected to the contacts in the receptacle to detect short circuits between the contacts.

2. The universal connector of claim 1 wherein the receptacle contacts comprise a plurality of generally annular, concentrically arranged conductive rings, each conductive ring being electrically insulated from the other conductive rings.

3. The universal connector of claim 2 wherein the receptacle has an opening, the conductive rings have different diameters, and the conductive ring with the largest diameter is located adjacent to opening.

4. A method of identifying a probe type in a drop mechanism for probes of the type used for measuring one or more parameters of molten material after the probe is connected to the drop mechanism, the drop mechanism including a plurality of universal connectors, the method comprising:

placing at least one probe in the drop mechanism and inserting a probe connector from the at least one probe into a receptacle of one of the plurality of universal connectors located on the probe drop mechanism such that contacts on the probe connector are electrically connected to contacts in the universal connector;

detecting short circuits between the contacts located in each of the plurality of universal connectors; and identifying the probe type of the probe in at least one of the universal connectors based on the short circuits detected.

\* \* \* \* \*